United States Patent
Haberman et al.

(10) Patent No.: US 9,700,918 B2
(45) Date of Patent: Jul. 11, 2017

(54) SEAL SYSTEMS FOR GRAIN SEPARATORS

(75) Inventors: Matthew T. Haberman, Mahtomedi, MN (US); Kevin Weiss, West Lakeland, MN (US)

(73) Assignee: Carter Day International, Inc., Minneapolis, MN (US)

( * ) Notice: Subject to any disclaimer, the term of this patent is extended or adjusted under 35 U.S.C. 154(b) by 676 days.

(21) Appl. No.: 13/368,739

(22) Filed: Feb. 8, 2012

(65) Prior Publication Data

US 2013/0037456 A1 Feb. 14, 2013

Related U.S. Application Data

(60) Provisional application No. 61/441,465, filed on Feb. 10, 2011.

(51) Int. Cl.
*B07B 1/22* (2006.01)
*F16J 15/34* (2006.01)
*F16J 15/16* (2006.01)
*B07B 13/16* (2006.01)
*F16J 15/36* (2006.01)

(52) U.S. Cl.
CPC ............... *B07B 1/22* (2013.01); *B07B 13/16* (2013.01); *F16J 15/164* (2013.01); *F16J 15/344* (2013.01); *F16J 15/3464* (2013.01); *F16J 15/36* (2013.01)

(58) Field of Classification Search
CPC ..... B07B 1/22; B07B 1/46; A01F 7/02; A01F 12/44; A01F 12/442; A01F 12/444; A01F 12/446; A01F 12/448; F16J 15/164; F16J 15/344; F16J 15/3404; F16J 15/3464; F16J 15/36
USPC ............ 209/44.3, 284–300, 363; 460/79–81; 277/358, 377, 394
See application file for complete search history.

(56) References Cited

U.S. PATENT DOCUMENTS

| 5,403,020 | A  | * | 4/1995  | McOnie ...................... 277/390 |
| 5,507,396 | A  | * | 4/1996  | Hauch .......................... 209/399 |
| 6,290,235 | B1 | * | 9/2001  | Albertson ............. F16J 15/002 277/510 |
| 7,029,393 | B2 |   | 4/2006  | Hauch et al. |
| 7,862,412 | B2 |   | 1/2011  | Ernst et al. |
| 2007/0074998 | A1 | * | 4/2007  | Langner ....................... 209/284 |
| 2009/0318204 | A1 | * | 12/2009 | Ernst et al. ..................... 460/79 |

* cited by examiner

*Primary Examiner* — Joseph C Rodriguez
*Assistant Examiner* — Kalyanavenkateshware Kumar
(74) *Attorney, Agent, or Firm* — Fredrikson & Bryon, P.A.

(57) ABSTRACT

The invention includes a grain separator with a seal system. The seal system includes an elastomeric portion and an inelastomeric portion. The seal system interfaces with an inlet spout at at least two locations. The seal system is rotatable about an inlet spout. A sealing pressure is increased as grain interacts with the seal system.

12 Claims, 8 Drawing Sheets

SEAL SYSTEMS FOR GRAIN SEPARATORS

RELATED APPLICATIONS

This application claims priority to U.S. Provisional Application Ser. No. 61/441,465, filed Feb. 10, 2011, titled Seal Systems for Grain Separators, the contents of which are hereby incorporated by reference.

TECHNICAL FIELD

The application relates to seal assemblies for grain separators.

BACKGROUND

Grading machines (e.g., length grading machines), or grain separators, are typically used to separate a stream of grain containing various types and sizes of grain into its constituent parts, for example, wheat, durum, oats, barley and rice, and/or to separate such grains from seed contaminants. Examples of grading machines are discussed in U.S. Pat. Nos. 7,029,393 and 7,862,412, the contents of each of which are hereby incorporated by reference. These machines generally employ a rotating member, or cylinder, which is mounted in an interior space of a housing of the grain separator, and which includes lifting pockets, or indentations, located along an interior surface thereof. As the cylinder rotates, the indentations, according to their size, receive and lift particular lengths, or sizes, of granules out of a stream of grain and drop the granules into a trough that is mounted within the cylinder. The stream of grain is fed into the rotating cylinder by a spout, which extends through a sidewall of the housing and through an end piece of the indented cylinder.

To prevent grain from leaking out at an interface between the spout and the rotating cylinder, a fixed (i.e., non-rotating) seal is typically mounted about the spout so as to interface with an external surface of the cylinder end piece. Typically, these seals have been made from either relatively hard plastic or soft fibrous materials such as felt or sheep's skin. These seals rely on the contact surface area and/or the packing ability of the seal material to prevent granular material from moving past the seal. These typical materials are not conformal with the spout, and generally leave a small gap or clearance between the seal and the spout at least partially around the circumference of the seal/spout interface. Because of this clearance, it is common for both whole and broken grains to push their way past the seal, causing leakage and/or damage to the seal and sealing surface. Leakage of grain from the separating process is a nuisance and in many environments an unacceptable problem.

SUMMARY

According to embodiments of the invention, a grading machine, which includes a spout to deliver feed material to a rotating member, includes a seal system. In some embodiments, the seal system has at least a portion comprising an elastomeric material. In other embodiments, the seal system includes a dual seal interface between the sealing system and the spout. In yet other embodiments, the seal system is adapted to rotate along with the rotating member such that it rotates about the spout. Embodiments of the invention also include grading machines having any combination of the above mentioned embodiments, the seal systems themselves independent of the grading machine, and methods of making and using any of the embodiments of the grading machines and seal systems described herein.

BRIEF DESCRIPTION OF THE DRAWINGS

The following drawings are illustrative of particular embodiments of the invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments. Utilizing the teaching provided herein, those skilled in the art will recognize that many of the examples have suitable alternatives that can be utilized.

Figure 1:
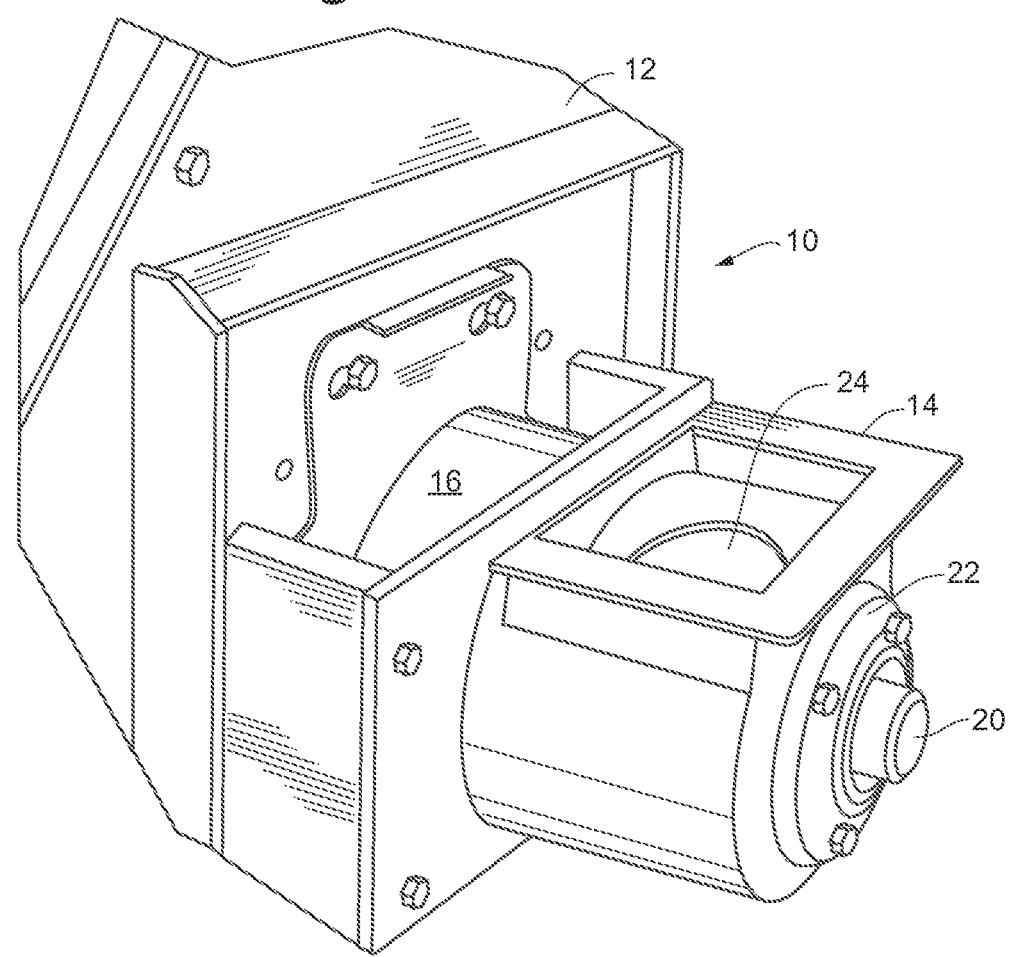
FIG. 1 is a perspective, broken away view of a grain separator and particularly the grain inlet.
Figure 2:
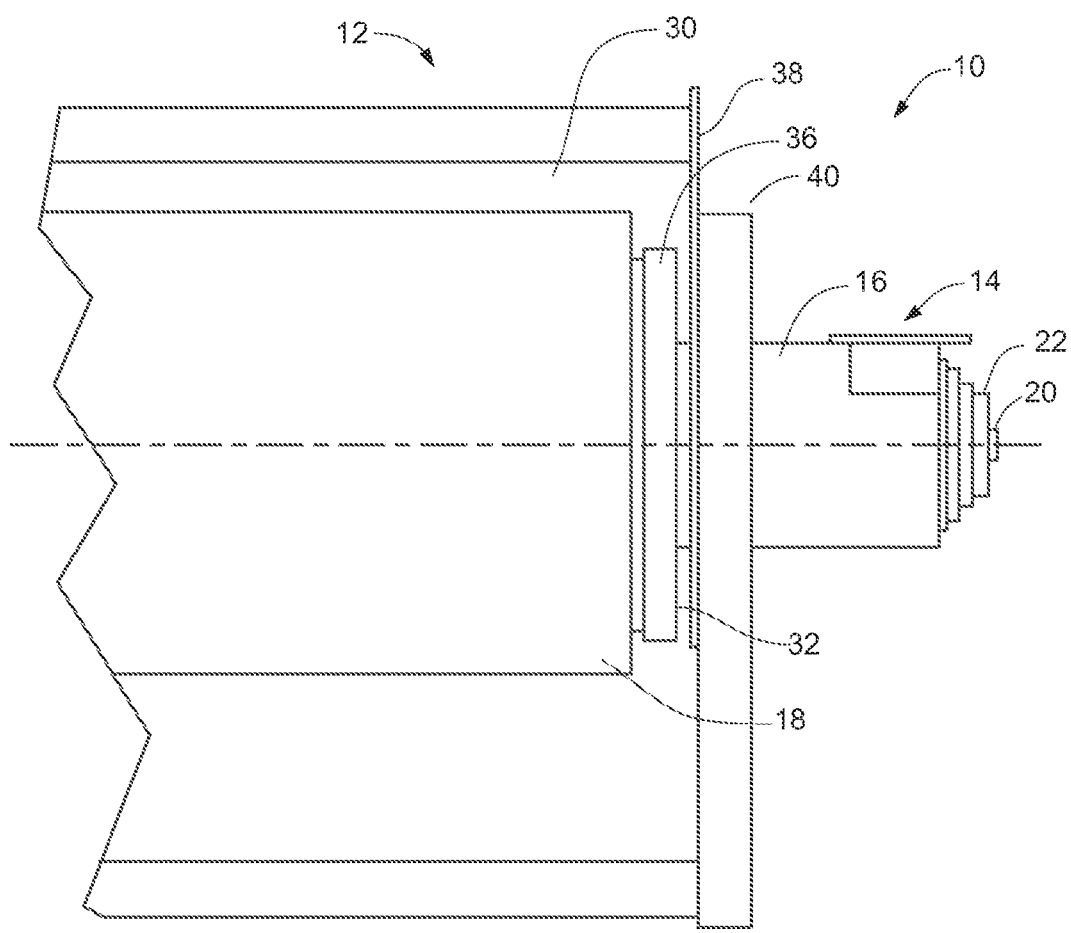
FIG. 2 is a side elevation view of a portion of a grain separator with a cut-away section.

FIG. 1 shows a broken away view of an illustrative grain separator. In the embodiment of FIG. 1, a grain separator is shown generally as 10, the separator having a housing 12. A grain inlet is shown generally as 14 and comprises an upwardly open container into which grain may be poured, the grain inlet including a spout 16. A cylinder (sometimes referred to as a drum) 18 (as shown in FIG. 2) is supported in the housing for rotation about its axis. A drive shaft 20 extends through the grain inlet 14 and is supported at its end by a bearing block 22. The drive shaft extends into the drum, and is supported at its other end beyond the far end of the drum (not shown). Drive shaft 20 is provided with a helical screw portion 24 within the grain inlet 14 for the purpose of driving grain through the spout 16 and into the cylinder 18.

FIG. 2 is a side elevation view of a portion of an illustrative grain separator 10 with a cut-away section. FIG. 2 illustrates grain separator 10 including an indented cylinder 18 mounted within an interior space 30 of housing 12. Cylinder 18 has an end surface 32, through which grain is conveyed into the interior of the cylinder. Although not shown in FIG. 2, those skilled in the art will appreciate that a cylinder rotator, such as a drive belt or direct geared drive coupled to a motor (e.g., an electric motor), which interfaces with an interface surface 36 may cause the cylinder to rotate in order to separate grain which is fed into an inlet opening 14 of spout 16. FIG. 2 further illustrates housing 12 including a first sidewall 38, which defines interior space 30. Housing 12 can also include a standoff section 40. In such embodiments, spout 16 extends through standoff section 40 and sidewall 38.

Figure 3:
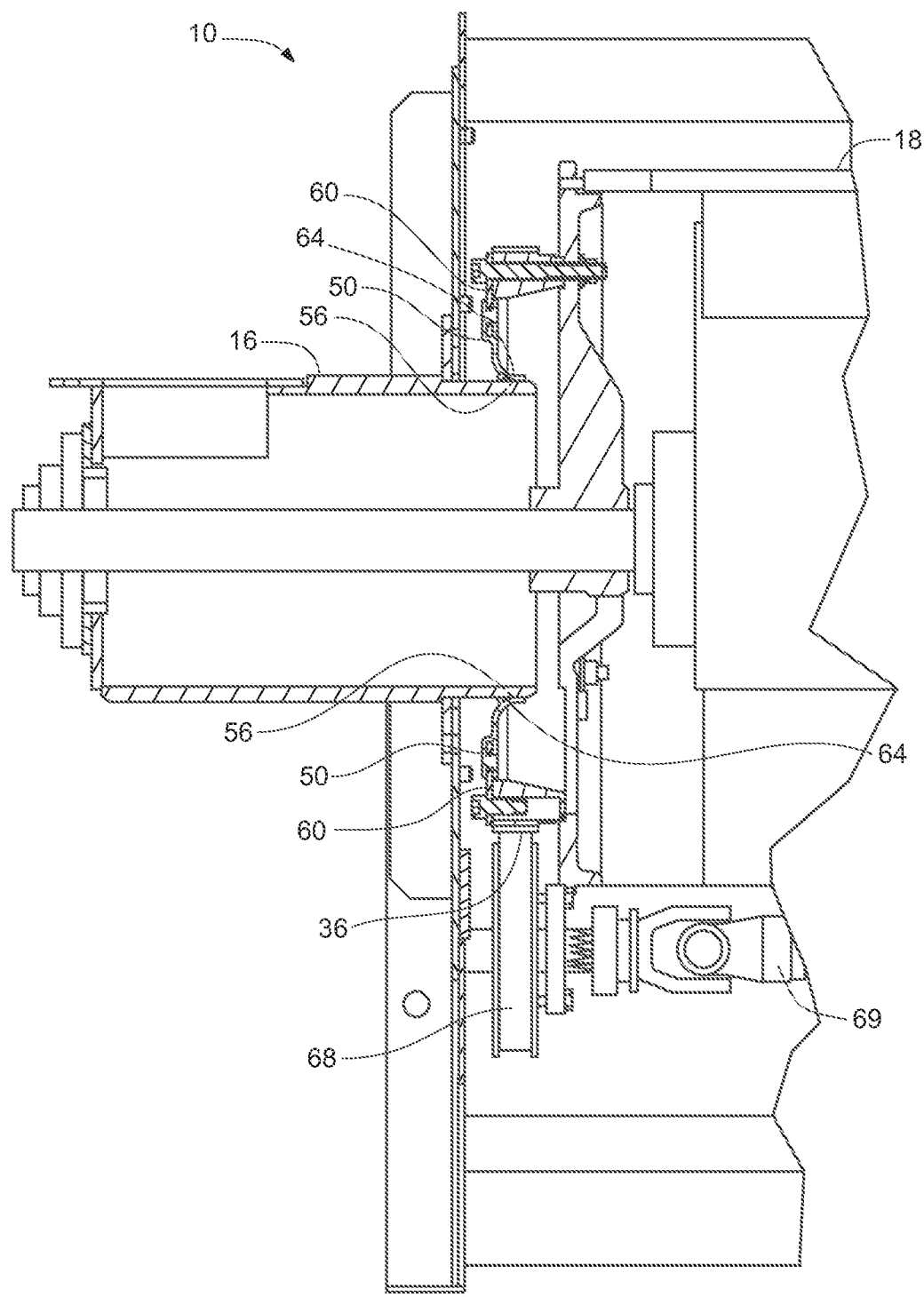
FIG. 3 is a side cut-away view of a portion of a grain separator in accordance with an embodiment of the invention.

FIG. 3 shows a side cut-away view of a grain separator having a seal system 50 in accordance with an embodiment of the invention. As shown, the seal system 50 circumferentially surrounds and is concentric with the spout 16 and contacts it at a sealing interface 56. In the embodiment shown in FIG. 3, the seal system 50 includes an inelastomeric portion 60 (shown as an outer portion) and an elastomeric portion 64 (shown as an inner portion). The inelastomeric portion and the elastomeric portion are typically concentric and can be integrally formed or coupled to each other. In some embodiments, the inelastomeric portion is useful for retaining the elastomeric portion and the elastomeric portion is useful for providing the sealing interface 56 between the seal system 50 and the spout 16.

In one example, the inelastomeric portion 60 can include a metal (e.g., steel), and the elastomeric portion 64 can include any elastomeric material that provides a conformal fit between the seal system and the inlet spout (e.g., a polymer). In certain embodiments, the elastomeric material is a resilient material. For example, the elastomeric portion 64 can include a resilient material that provides a conformal fit between the seal system and the inlet spout. The seal may include any material that exhibits viscoelastic characteristics, for example, a resilient Polyurethane (e.g., a FDA compliant urethane), Buna-N (Nitrile), Propylene (EPDM) Rubber, Neoprene rubber, Silicone rubber, and Fluoroelastomers such as (DuPont) Viton. The elastomeric characteristics of the material provide a snug, conformal seal between the seal system and the inlet spout which prevents product from escaping and potentially damaging the sealing surfaces.

FIG. 3 also shows a cylinder rotator 68 useful for rotating the cylinder 18. As shown, the cylinder rotator 68 can be in apposition to the interface surface 36. Further, the cylinder rotator 68 can be connected to one or more drivers, such as a drive shaft 69. In turn, the driver can be connected to an electric motor (not shown).

Further referring to FIG. 3, embodiments of the seal system 50 having an inelastomeric portion 60 are also useful for optionally connecting the seal system to the rotating cylinder 18. In such embodiments, the seal system 50 rotates along with the cylinder and about the spout 16, yet the elastomeric portion maintains sealing contact with the spout 16 during rotation. Such an embodiment differs greatly from typical seals, which are generally stationary and rely on a key and keyway arrangement to prevent rotation of the seal when the cylinder 18 is rotating. This lack of rotation by the seal allows material to build up by the seal, increasing the probability it will leak past the seal. Additionally, gaps or clearances are required between the key and keyway to allow for ease of assembly. These clearances can be a significant source of product leakage. In contrast, the rotating embodiment of the seal system 50 in accordance with the invention shown in FIG. 3 substantially eliminates these clearances and, because it rotates, it continuously moves material off the seal system to prevent build up.

Figure 4:
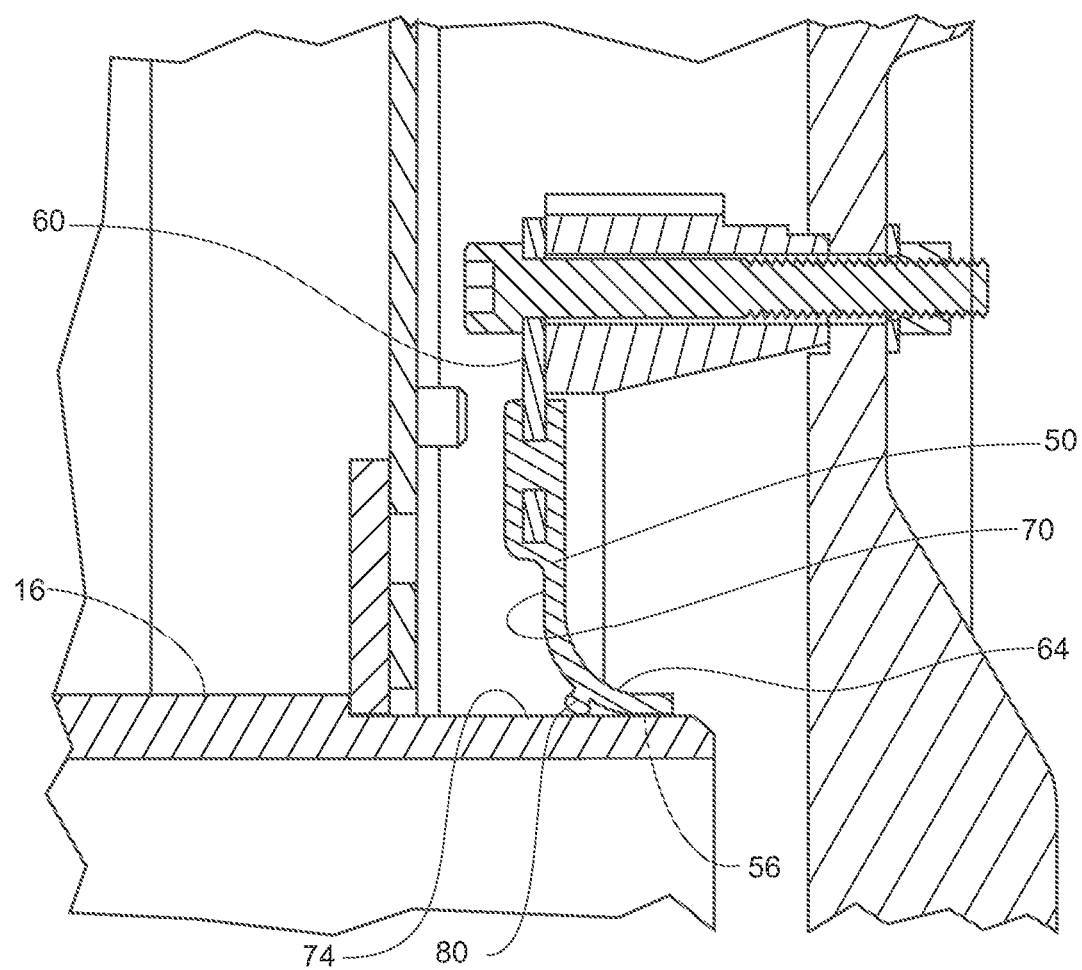
FIG. 4 is a close-up view of a portion of FIG. 3 highlighting a seal system-spout interface.

FIG. 4 shows a close-up view of a portion of FIG. 3 highlighting the sealing interface 56 between the seal system 50 and the inlet spout 16. As shown, the elastomeric portion 64 extends towards the spout 16 from the inelastomeric portion 60. Also as shown, the elastomeric portion has a first surface 70 substantially perpendicular to an outer circumference 74 of the inlet spout 16 when proximate the inelastomeric portion 60 and substantially parallel to the outer circumference 74 of the spout 16 at the sealing interface 56. In such embodiments, the spout 16 deflects the elastomeric portion 64 to provide an elongated sealing interface 56 to improve sealing performance. In such a configuration, the pressure between the seal system 50 and the spout 16 increases as granular material backs up against it (i.e., the material tends to force the seal system 50 against the spout 16), thus improving the seal and reducing the possibility of leakage. This is in contrast to traditional seals, where material tends to force the seal away from the inlet spout 16.

Also as shown in FIG. 4, some embodiments of the seal system 50 include a secondary spout contacting member 80 (such embodiments may be referred to as a "dual seal interface"). Such a member helps to prevent contamination from entering the interface between the seal system 50 and spout from the outside of the machine. Further, the member 80 may help to trap a small amount material (e.g., grain dust) between the seal system 50 and spout. This small amount of material helps to lubricate the interface between the seal and spout, reducing the friction and allowing for better wear characteristics.

Figure 5:
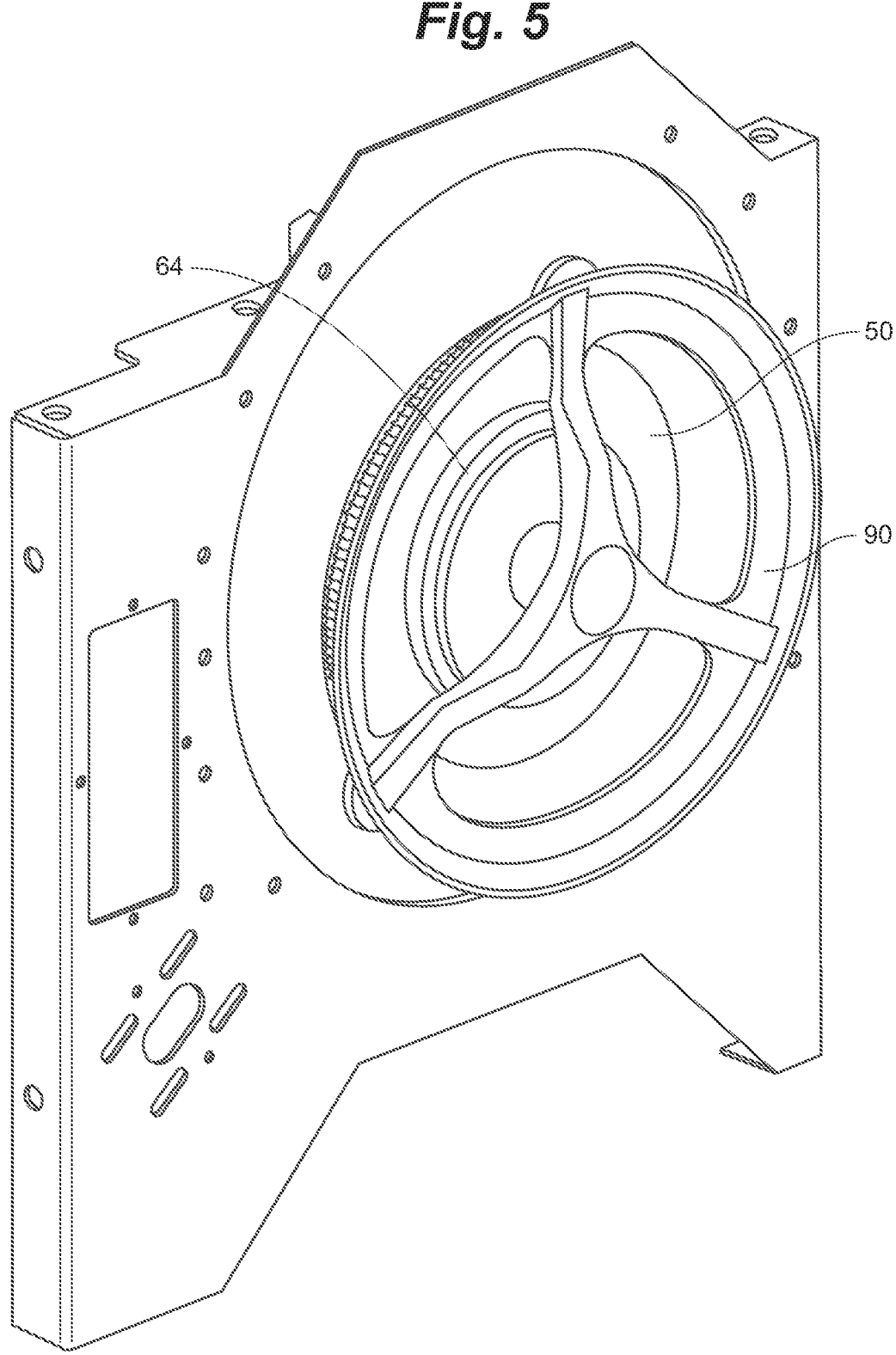
FIG. 5 is a perspective view of a portion of a grain separator in accordance with an embodiment of the invention.
Figure 6:
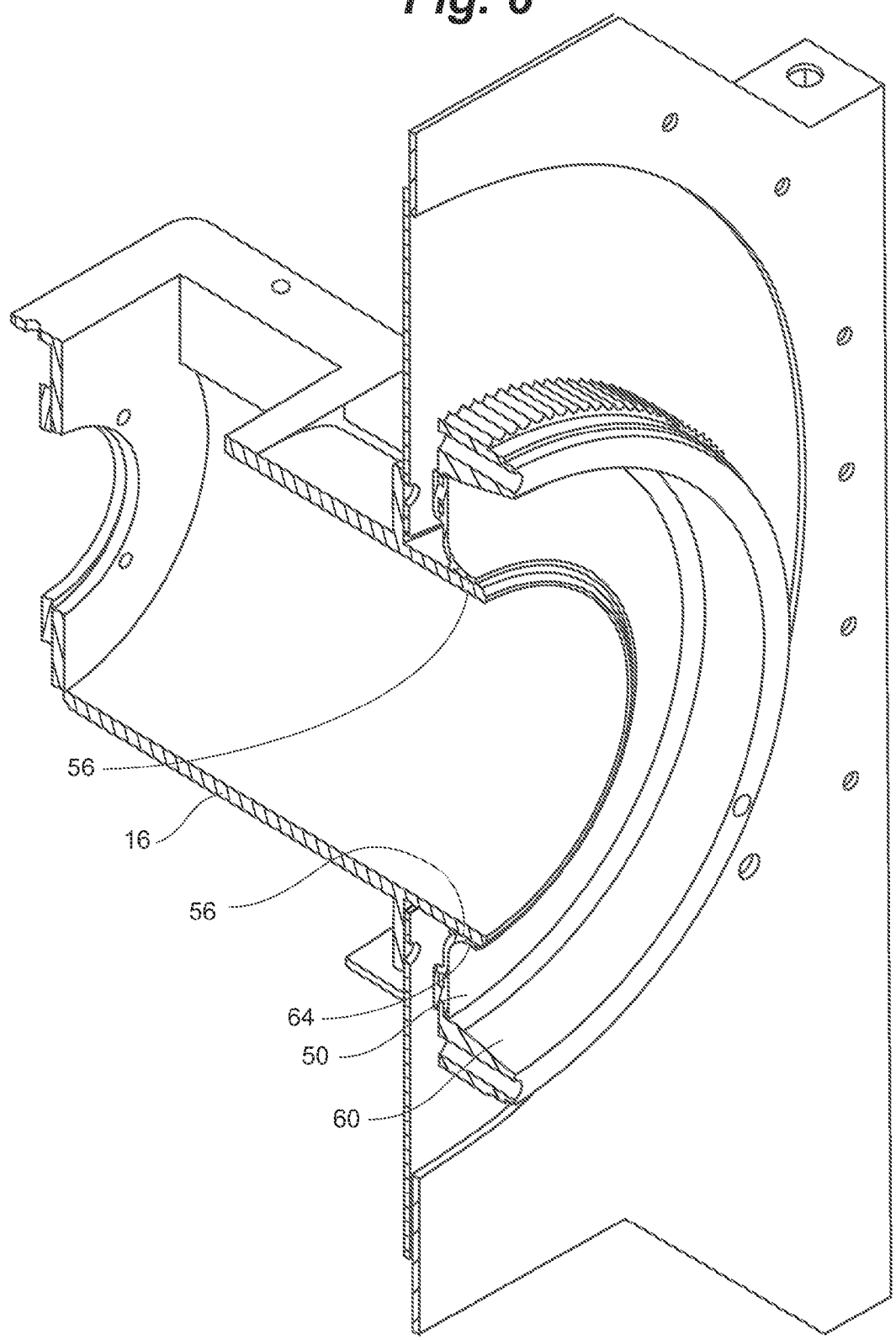
FIG. 6 is a perspective cut-away view of a portion of a grain separator in accordance with an embodiment of the invention.
Figure 7:
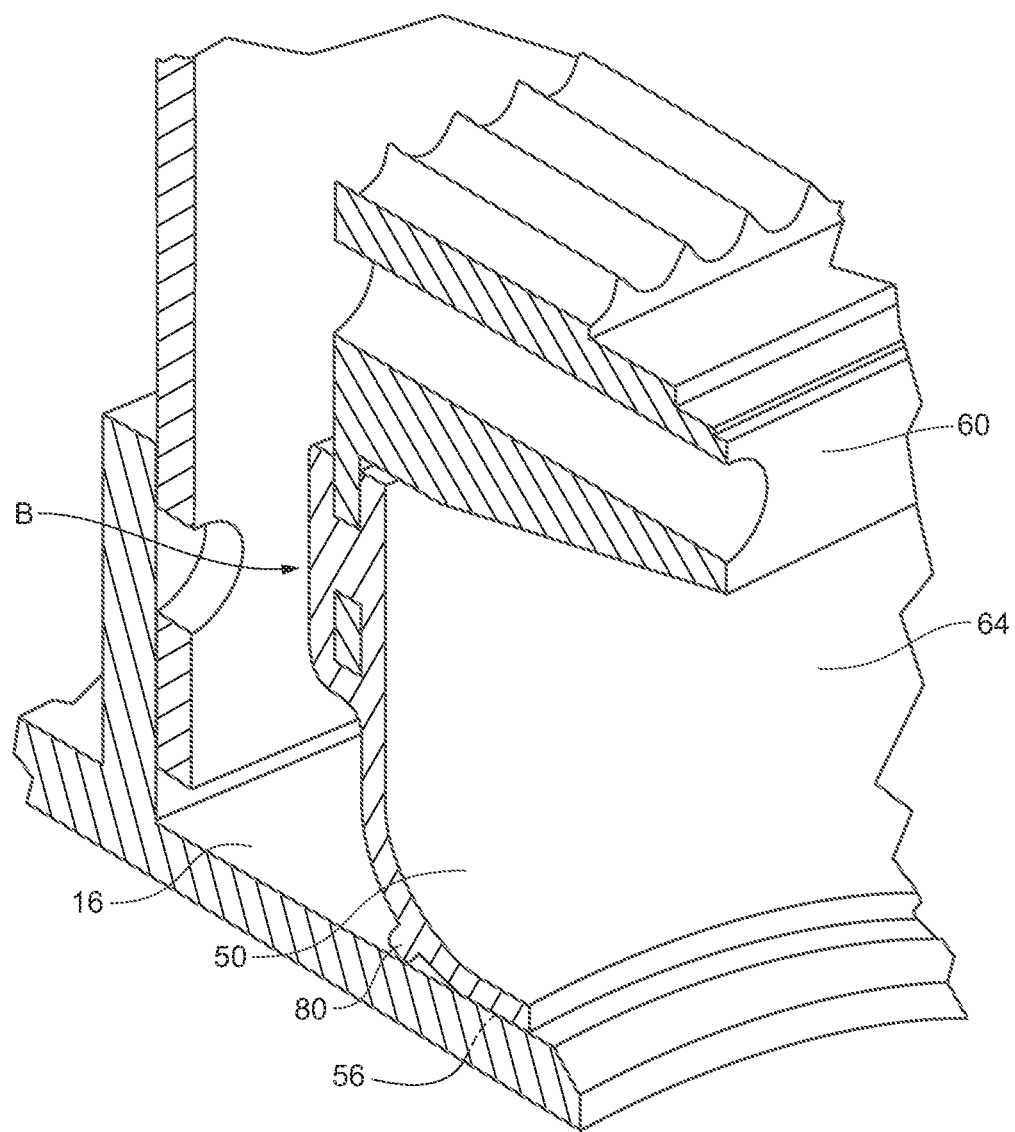
FIG. 7 is a close-up view of a portion of FIG. 6 highlighting the seal system-spout interface.

FIG. 5 shows a perspective view of a portion of a grain separator in accordance with an embodiment of the invention. As shown in FIG. 5, an internal spider structure 90 for supporting a screw drive shaft (not shown in FIG. 5) may be provided. In some embodiments, the inelastomeric portion 60 of the seal system 50 is coupled to the spider portion vie (e.g., bolts). FIG. 6 shows a cut-away perspective view of a grain separating machine and seal system 50 in accordance with an embodiment of the invention, and FIG. 7 shows a close-up view of FIG. 6 highlighting the seal system and spout interface 56. In FIG. 7 it can be seen that the inelastomeric material and the elastomeric material are bonded together in a bonding area B.

Figure 8:
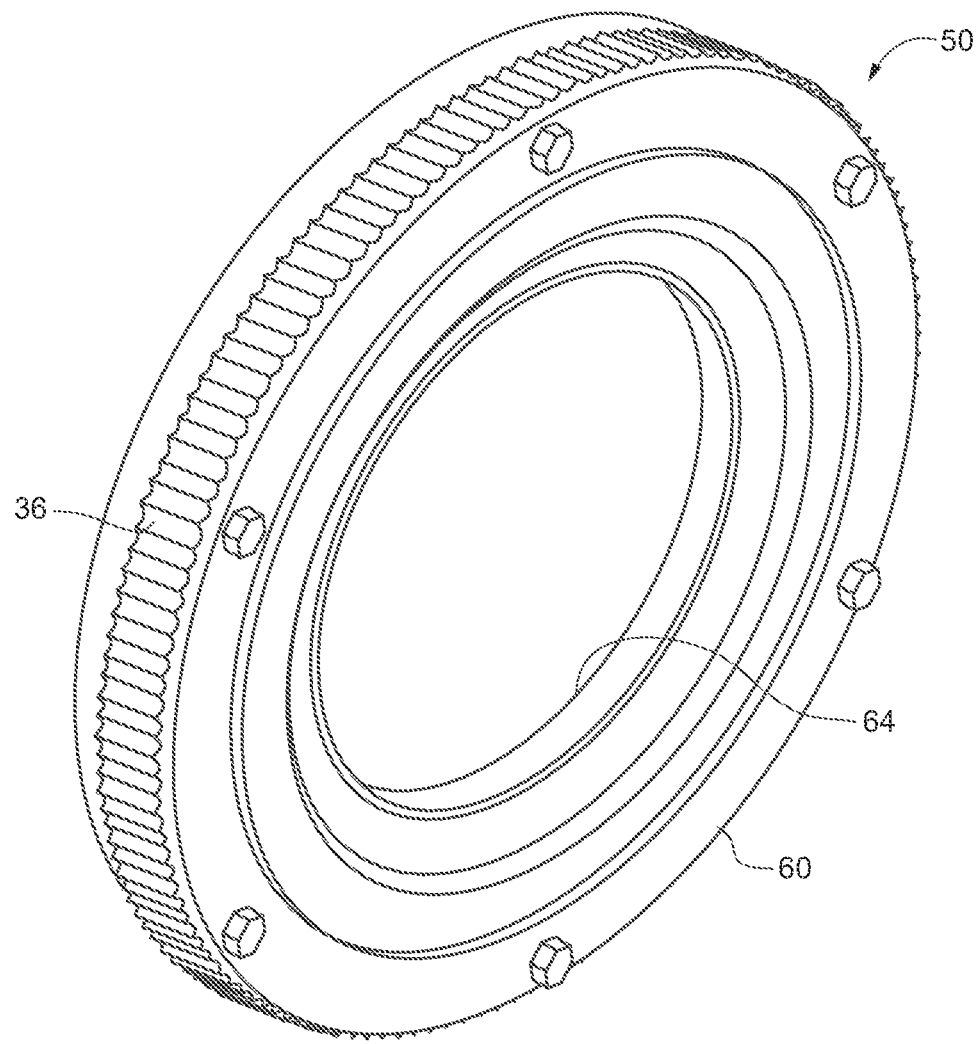
FIG. 8 is a front perspective view of a seal system in accordance with an embodiment of the invention.

FIG. 8 shows a front perspective view of the sealing system. As shown, the seal system 50 can include an annular shape and the inelastomeric portion 60 can be outward of and concentric with the elastomeric portion 64. Also as shown, the inelastomeric portion 60 can be provided with the interface surface 36, which can include features, such as teeth, to facilitate functional connection with a cylinder rotator in embodiments where the seal system rotates along with the drum, as described above.

Embodiments of the invention also include methods of making and operating any of the embodiments of the grain separators and seal systems discussed above. In one example, the invention includes a method of providing a grain separator comprising the steps of providing a housing and a rotatable grain separation cylinder within the housing. The cylinder may have an end surface and a grain inlet may have an inlet spout extending through the end surface for conveying grain into the cylinder in a feed zone. Such an embodiment further includes the steps of installing any of the seal assemblies discussed herein.

Embodiments of the invention also include methods of operating any of the grain separator embodiments discussed above. Such embodiments can include the steps of introducing grain into a grain separator and removing the separated grain streams from the grain separator. Embodiments can also include conforming an elastomeric portion of a seal system with an inlet spout, interfacing a seal system at at least two locations along a length of an inlet spout, rotating a seal system about an inlet spout, and/or increasing a sealing pressure between the seal system and the inlet spout with grain material. Grain may be pushed though the grain separator at a higher rate compared to grain separators with traditional seal locations. Further, embodiments of the invention also include replacing a worn seal on a grain separator. Such a method includes removing a worn seal and replacing it with any of the embodiments of seal assemblies discussed herein.

In the foregoing detailed description, the invention has been described with reference to specific embodiments. However, it may be appreciated that various modifications and changes can be made without departing from the scope of the invention.

What is claimed is:

1. A grain separator, comprising:
   a housing;
   a rotatable grain separation cylinder within the housing;
   a grain inlet having an inlet spout extending through the housing for conveying grain into the cylinder; and
   a seal system interfacing with the inlet spout, the seal system comprising at least a portion of elastomeric material, the portion of elastomeric material extending radially toward the inlet spout and being deflected axially toward an interior of the rotatable grain separation cylinder by the inlet spout so as to define an elongated sealing surface contacting the inlet spout.

2. The grain separator of claim 1, wherein the seal system includes an inelastomeric portion and an elastomeric portion.

3. The grain separator of claim 2, wherein the elastomeric portion comprises a polymer and the inelastomeric portion comprises a metal.

4. The grain separator of claim 1, wherein the seal system is circumferential about the inlet spout.

5. The grain separator of claim 1, wherein the seal system is concentric with the inlet spout.

6. The grain separator of claim 1, wherein the elongated sealing surface contacts the inlet spout at at least two positions spaced along a length of the inlet spout with a gap between the two positions.

7. The grain separator of claim 1, wherein the seal system is rotatable with the rotatable grain separation cylinder about the inlet spout.

8. The grain separator of claim 7, wherein the seal system includes an inelastomeric portion defining a driving surface for rotating the rotatable grain separation cylinder.

9. The grain separator of claim 1, wherein the seal system is configured such that a sealing pressure between the seal system and the inlet spout increases as grain material introduced to the grain separator backs up against the seal system.

10. A grain separator, comprising:
    a housing;
    a rotatable grain separation cylinder within the housing;
    a grain inlet having an inlet spout extending through the housing for conveying grain into the cylinder; and
    a seal system interfacing with the inlet spout, the seal system comprising a sealing material extending radially toward the inlet spout and being deflected axially toward an interior of the rotatable grain separation cylinder by the inlet spout so as to define an elongated sealing surface contacting the inlet spout such that a sealing pressure between the seal system and the inlet spout increases as grain material introduced to the grain separator backs up against the seal system.

11. The grain separator of claim 10, wherein the seal system is rotatable with the rotatable grain separation cylinder about the inlet spout.

12. The grain separator of claim 11, wherein the seal system comprises at least a portion of elastomeric material.

* * * * *